Figure 1:
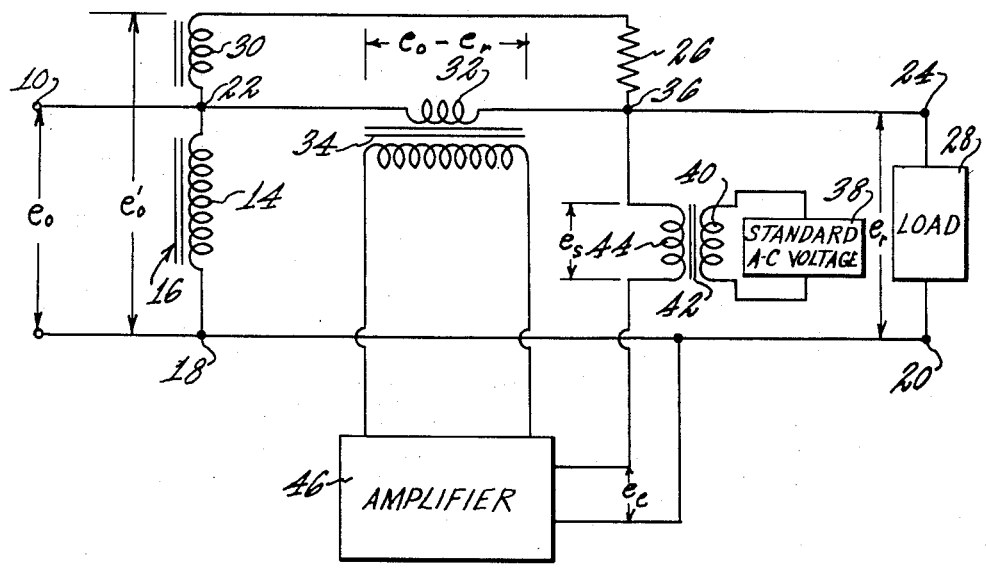

June 17, 1958 — M. ARTZT — 2,839,719
VOLTAGE AND WAVEFORM REGULATOR
Filed May 10, 1956 — 2 Sheets-Sheet 1

INVENTOR.
MAURICE ARTZT
BY
ATTORNEY

June 17, 1958     M. ARTZT     2,839,719
VOLTAGE AND WAVEFORM REGULATOR
Filed May 10, 1956     2 Sheets-Sheet 2
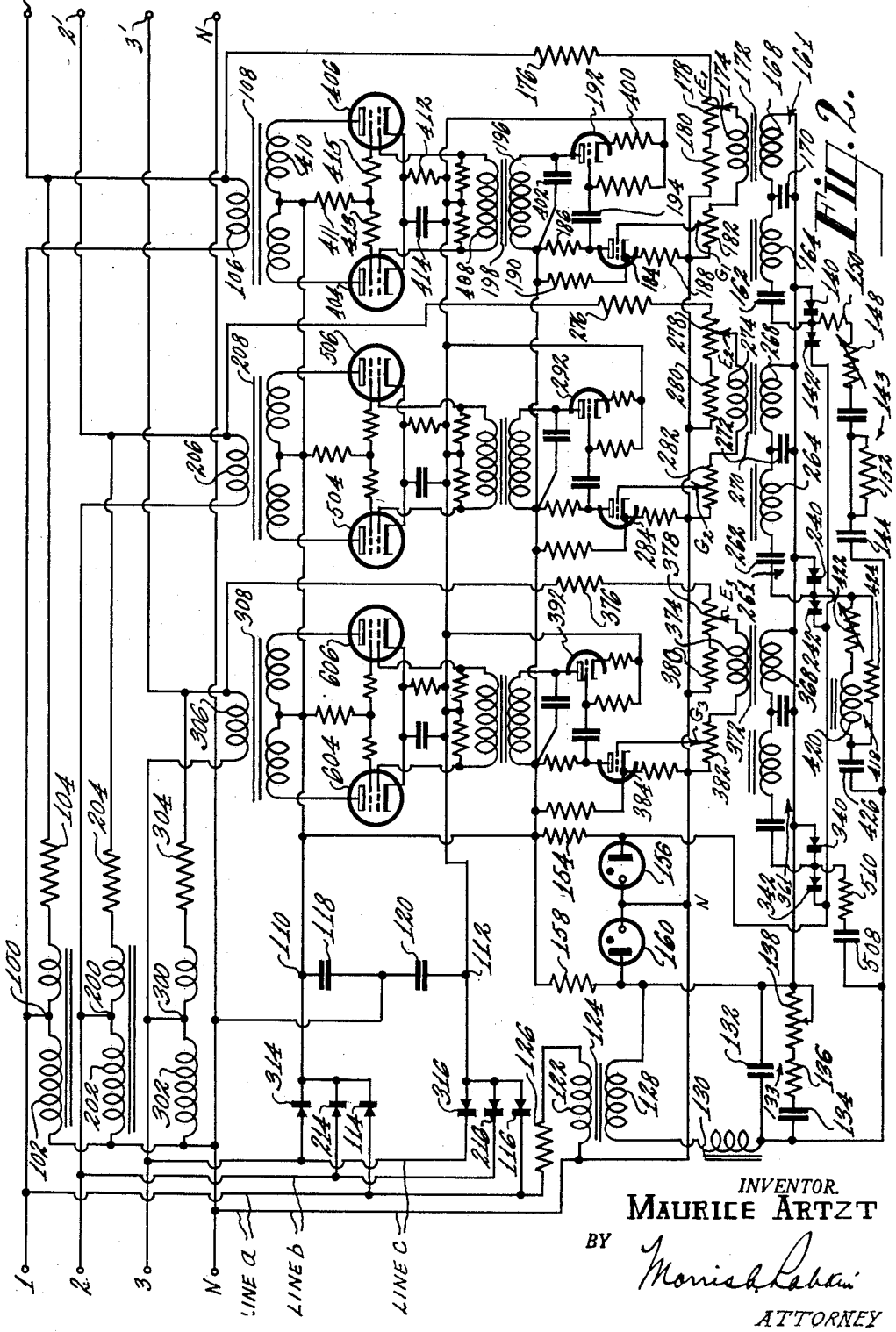
INVENTOR.
MAURICE ARTZT
BY
ATTORNEY

United States Patent Office 2,839,719
Patented June 17, 1958

2,839,719

VOLTAGE AND WAVEFORM REGULATOR

Maurice Artzt, Princeton, N. J., assignor to Radio Corporation of America, a corporation of Delaware Application May 10, 1956, Serial No. 584,111

11 Claims. (Cl. 323—45)

This invention relates to alternating current (A.-C.) voltage and waveform regulators of the type adapted to provide a regulated A.-C. output voltage whose amplitude, waveform, and phase are independent of fluctuations in the A.-C. supply voltage and/or in the load. The voltage and waveform regulators of the present invention are particularly useful in supplying energy to induction motors whose speeds and output torques are to be maintained substantially constant.

It has been proposed to regulate an A.-C. voltage connected to a load by generating an A.-C. reference voltage and by comparing the reference voltage to the A.-C. output voltage in order to obtain an error signal. The error signal is amplified and applied in series with the A.-C. supply voltage and the load with a polarity tending to diminish the error signal. In such prior art A.-C. voltage regulators, the output means of the amplifier is usually the secondary winding of a transformer that is connected in series with the A.-C. supply voltage and the load. Thus, the full load current flows through this secondary winding at all times. The power loss, due to the series circuit comprising the output circuit of the amplifier, the supply voltage and the load, when the voltage across the load is identical with that of the reference voltage, is the product of the square of the current through the load and the impedance of the secondary winding of the amplifier, viewed from the terminals connected in series with the A.-C. supply voltage circuit. Since this impedance, which may be referred to as a reflected impedance, should be as small as possible, the gain of some prior art amplifiers have been stabilized at unity by a relatively high percentage of current and/or voltage negative feedback in order to make the effective impedance of the output circuit of the amplifier small. Thus, the efficiency of most of the prior art A.-C. regulators is limited, in part, by the power loss in the aforementioned secondary winding.

Accordingly, it is an object of the present invention to provide A.-C. voltage and waveform regulators adapted to overcome, or to minimize, the aforementioned disadvantages of prior art A.-C. voltage and waveform regulators.

It is another object of the present invention to provide improved A.-C. voltage and waveform regulators adapted for use with either single or polyphase loads in which the waveform of the power output may be of any desired character, for example a pure sine wave, and the recovery time from transients in either the A.-C. supply voltage or the load is approximately one cycle or less.

Still another object of the present invention is to provide a polyphase voltage and waveform regulator wherein each of the polyphase output voltages are constant, and the phase angles between the output voltages are held substantially constant.

A further object of the present invention is to provide an A.-C. voltage and waveform regulator wherein a compensating voltage, the output voltage of an amplifier, for example, is applied between opposite points of a bridge circuit arrangement in a manner whereby at least a portion of the current from the A.-C. supply voltage to the load always passes through a pair of adjacent arms of the bridge circuit, rather than all through the output means of the amplifier.

A still further object of the present invention is to provide an improved A.-C. voltage and waveform regulator wherein none of the load current flows through the output means of an amplifier of the regulator when the output voltage is equal to a standard, or reference, A.-C. voltage.

Yet another object of the present invention is to provide an improved A.-C. voltage and waveform regulator employing an amplifier wherein the amplification factor need not be maintained at unity and wherein feedback means are not necessary to reduce the reflected impedance of the amplifier output means.

These objects and related advantages are attained in a novel A.-C. voltage and waveform regulator adapted to provide an A.-C. output voltage of regulated amplitude, phase, and waveform. An unregulated input A.-C. supply voltage is stepped up by an autotransformer, and the stepped-up A.-C. voltage is, in turn, applied to a load through a serially connected resistor. A standard, or reference, A.-C. voltage for comparison purposes is generated and controlled so as to be in phase with the input A.-C. supply voltage, but constant in amplitude, and as near a sine wave as possible. This standard A.-C. voltage is subtracted from the voltage across the load to give an error signal which indicates by amplitude and phase the difference between the standard A.-C. voltage and the A.-C. output voltage across the load. The error signal is amplified in an amplifier whose output voltage is applied between a point on the autotransformer and the junction of the aforementioned serially connected resistor and the load. This amplified error signal is applied from the secondary winding of the output transformer of the amplifier. The secondary winding is connected between the point on the autotransformer to which the input A.-C. supply voltage is applied and to the junction between the aforementioned serially connected resistor and the load. The output stage of the amplifier is adapted to supply whatever difference in power is required to hold the A.-C. output voltage across the load fixed over a relatively wide range of input A.-C. supply voltages and/or changes in the load. Any compensating voltage necessary, that is, the output of the amplifier, is applied in a bridge circuit arrangement in a manner whereby at least a portion of the load current always flows through adjacent arms of the bridge circuit, and the entire amount of load current never flows through the secondary winding of the output transformer of the amplifier. Where a polyphase voltage, for example, a three phase voltage, is to be regulated, three single regulators of the above-mentioned type are used. A novel three phase standard of comparison for the phase angles between the output voltages is also employed. In accordance with the present invention, the voltage of a first standard A.-C. voltage is fixed in phase with respect to one of the three line voltages of the three phase input A.-C. supply voltage. Second and third standard A.-C. voltages are placed at −120° and −240° with respect to the first standard A.-C. voltage. Thus, the second and third phases are determined independently of the input phases from line voltages of the A.-C. supply voltage, whereby the line angular wandering is one of the errors eliminated in the regulator of the present invention.

The novel features of the present invention, as well as the invention itself, both as to its organization and method of operation, will be understood in detail from the following description when considered in connection with the accompanying drawings in which similar reference characters represent similar parts and in which:

Fig. 1 is a schematic diagram, partly in block form, of a single phase A.-C. voltage and waveform regulating system illustrating principles of operation of the present invention; and Fig. 2 is a schematic diagram of a three phase A.-C. voltage and waveform regulator in accordance with the present invention.

Referring now to Fig. 1, there is shown a voltage and waveform regulator for a single phase A.-C. supply voltage. An A.-C. supply voltage $e_o$, from any suitable source (not shown), is applied between input terminals 10 and 12 of the regulator. This A.-C. supply voltage $e_o$ is applied across the primary 14 of an autotransformer 16, and stepped up to a voltage $e_o'$ between the ends of the autotransformer 16. The input terminal 12 is connected to the low voltage end 18 of the autotransformer 16, and to an output terminal 20 of the regulator. The input terminal 10 is connected to a point 22 intermediate the ends of the autotransformer 16. An output terminal 24 is connected to the high voltage end of the autotransformer 16 through a relatively low impedance, such as a resistor 26. A load 28 is connected between the output terminals 20 and 24. The A.-C. output voltage across the load 28 may be indicated by an output regulated voltage $e_r$. For best operation with a fixed load, the value of the resistor 26 will be so chosen that the load voltage $e_r$ is approximately equal to the supply voltage $e_o$ at its midrange. Under these conditions, the step-up in voltage resulting from the portion 30 between the high voltage end of the autotransformer 16 and the high voltage end of the primary winding 14 raises the supply voltage an amount substantially equal to the drop in voltage across the resistor 26. A secondary winding 32 of an output transformer 34 is connected between the junction 22 of the autotransformer 16 and a junction 36, between the resistor 26 and the load 28, or output terminal 24. Under conditions where the supply voltage $e_o$ is substantially equal to the output voltage $e_r$, the voltage across the secondary winding 32 of the primary transformer 34 will be substantially zero.

A standard, or reference, voltage $e_s$, for comparison purposes, is generated by any suitable means as by a 60 cycle A.-C. generator 38, whose output voltage is constant in amplitude and as near a sine wave as possible. The standard A.-C. voltage generator 38 is locked into phase with the line A.-C. supply voltage $e_o$, as will be explained hereinafter in Fig. 2. The output of the A.-C. generator 38 is applied to the primary 40 of a transformer 42. The standard A.-C. voltage $e_s$ is derived across the secondary 44 of the transformer 42. The amplitude of the standard A.-C. voltage $e_s$ is fixed, as in a manner to be explained in Fig. 2, and has the same waveform desired for the output voltage $e_r$ across the load 28. The standard voltage $e_s$ is applied between the common junction 36 and the output terminal 20, so that it is subtracted from the output voltage $e_r$ to give an error signal $e_e$ which indicates by amplitude and phase how much $e_r$ differs from $e_s$. In the embodiment illustrated in Fig. 1, the low voltage end of the secondary winding 44 of the transformer 42 is connected to the input of an amplifier 46 in a manner whereby the error signal $e_e$ is applied to the input of the amplifier 46 to amplify any differences between the output voltage $e_r$ and the standard voltage $e_s$.

The error signal $e_e$ is amplified by the amplifier 46 and applied to the secondary winding 32 of the output transformer 34 of the amplifier 46 with the correct polarity to make the error signal $e_e$ a minimum. The compensating voltage across the secondary winding 32 of the output transformer 34 must be capable of supplying whatever difference in power is required to hold the output voltage $e_r$ fixed, when the supply voltage $e_o$ is at its minimum or maximum value. If the output voltage $e_r$ and the standard voltage $e_s$ are out of phase, the amplifier 46 must also furnish the reactive power for the angular difference.

For example, if the input voltage $e_o$ were 120 volts, with possible minimum and maximum values of 110 to 130 volts, the load current one ampere, and the step-up transformer tapped to deliver 135 volts from 120 volts, then the resistor 26 would be 15 ohms, and $e_o - e_r$ would equal zero at 120 volts input. At 110 volts input, $e_o'$ would be 124 volts, and the resistor 26 would furnish a four volt drop, or 0.226 ampere. The secondary winding 32 would have to furnish 0.733 ampere at 10 volts or 7.333 watts. At 130 volts input, $e_o'$ would be 146.2 volts, and the resistor 26 would have a 26.2 volt drop and furnish 1.746 amperes. The secondary winding 32 would have to absorb 0.746 ampere at 10 volts or 7.46 watts. Thus, it will be understood, that no current flows through the secondary winding 32 when the input voltage $e_o$ equals the output voltage $e_r$, and that at no time does all of the current from the supply voltage $e_o$ flow through the secondary winding 32 to the load 28, because the secondary winding 32 is in parallel with the winding 30 of the autotransformer 16 and the resistor 26.

Referring now to Fig. 2, there is shown a voltage and waveform regulator of the present invention for regulating a three phase A.-C. supply voltage, as for example, a 120–208 volt three phase line. The voltage and waveform regulator of the present invention will be described in detail in connection with a three phase power line for illustrative purposes only, but it will be understood that the present invention may be used with either a single phase line or a polyphase line. It will also be understood that the values of the components in Fig. 2 are merely illustrative and are not to be construed in a limited sense. The three phase A.-C. supply voltage may be derived from any suitable source (not shown) and applied to the voltage and waveform regulator circuit through input terminals 1, 2, 3, and N, the latter representing the neutral connection of the line. Thus, input lines $a$, $b$, and $c$ represent the voltages between terminals 1 and N, 2 and N, and 3 and N, respectively. Input terminals 1, 2, and 3 are connected to intermediate points 100, 200, and 300 of autotransformers 102, 202, and 302. The low voltage ends of the autotransformers 102, 202, and 302 are connected to the neutral terminal N, and the high voltage ends thereof are connected to output terminals 1', 2', and 3', through resistors 104, 204, and 304, respectively. The secondary windings 106, 206, and 306 of output transformers 108, 208, and 308 are connected between the intermediate points 100, 200, and 300 on the autotransformers 102, 202, and 302 and output terminals 1', 2', and 3' of the regulator.

Means are provided to supply a direct current (D.-C.) voltage for amplifiers, and voltage regulator (V. R.) tubes to be used as a diode limiter bias, in a manner to be explained hereinafter. To this end, there is provided a six phase transformerless rectifier adapted to provide about 300 volts direct current at a total of about 450 milliamperes between D.-C. output terminals 110 and 112. Input terminals 1, 2, and 3 are connected to the terminal 110 through diodes 114, 214, and 314, respectively. Input terminals 1, 2, and 3 are connected to the output terminal 112 through diodes 116, 216, and 316, respectively. The diodes 114, 214, 314, 116, 216, and 316 are poled so as to provide a full-wave rectified voltage between the D.-C. output terminals 110 and 112. Serially connected filter capacitors 118 and 120 are connected between the output terminals 110 and 112. The common junction between the filter capacitors 118 and 120 is connected to the neutral terminal N.

Means are provided to supply a separate standard A.-C. voltage for each of the lines of the input polyphase voltage. To this end, the primary 122 of the step-up transformer 124 is connected between the input terminals 1 and N through a resistor 126. The secondary winding of the transformer 124 is connected across a 60 cycle filter comprising a choke 130 and a serially connected capacitor 132. A phase shifting network 133, comprising a capacitor 134 connected in series with serially connected resistors 136 and 138, is connected across the capacitor 132. The resistor 138 may be variable for adjusting the phase of the voltage across the capacitor 132 with respect to the voltage across the primary winding 122 of the transformer 124. It will now be understood that though the input voltage to the primary 122 of the transformer 124 may be 120 volts, the voltage across the capacitor 132 may be in the neighborhood of 500 volts root-mean-square (R. M. S.).

By limiting the voltage across the capacitor 132 to a relatively very small fixed peak-to-peak voltage, and by passing the resulting square wave through a suitable 60 cycle filter network, for example, a standard A.-C. voltage of constant amplitude and a substantially pure sine wave form may be obtained. The step-up voltage across the capacitor 132 is shifted in phase by the phase shifting network 133 so that it is retarded 60° with respect to the voltage across input line $a$, that is, between the input terminals 1 and N. This latter adjustment is obtained by varying the resistance of the resistor 138. The stepped-up voltage, thus adjusted, is applied to a pair of serially connected diode limiters 140 and 142. The junction of the capacitor 132 and the resistance 138 is connected to the anode of the diode 140. The junction of the capacitors 132 and 134 is connected to the common junction between the diodes 140 and 142 through a +60° phase shifting network 143 comprising a series circuit of a blocking capacitor 144, a capacitor 146, a variable resistor 148 and a resistor 150. A resistor 152 is connected across the capacitor 146. Thus, it will be understood that since the voltage across the capacitor 132 is retarded 60° with respect to the input voltage between the terminals 1 and N, the voltage applied to the limiter diodes 140 and 142 is advanced by an equal angle of opposite sign.

The output of the limiter diodes 140 and 142 is a square wave limited to a relatively small and constant peak-to-peak voltage, about 30 volts. This latter voltage is obtained as follows: The D.-C. voltage between the D.-C. output terminal 110 and a neutral terminal N is shunted by a resistor 154 and a serially connected V. R. tube 156. The voltage between the terminal 110 and the neutral terminal N is also shunted by a resistor 158 and a serially connected V. R. tube 160. It will now be understood that if the V. R. tube 156 has a greater voltage drop across it and the V. R. tube 160, the voltage between the anodes of the V. R. tubes 156 and 160 will be the difference between the voltage drops across each of the V. R. tubes. Thus, if the voltage drop across the V. R. tube 156 is 105 volts and the voltage drop across the V. R. tube 160 is 75 volts, the voltage between the anodes of the V. R. tubes 156 and 160 will be a relatively constant voltage of 30 volts. This relatively small constant voltage is used to limit the conduction of the diodes 140 and 142. The anode of the V. R. tube 156 is connected to the cathode of the diode 142, and the anode of the V. R. tube 160 is connected to the anode of the diode 140.

The constant output of the diode limiters 140 and 142 is applied to a 60 cycle filter 161 whereby the harmonics of the limited square waves are attenuated and a substantially pure fundamental sine wave is obtained. This latter filter 161 comprises a series circuit of a capacitor 162, an inductor 164, and an inductor 168, connected across the diode 140. A filter capacitor 170 is connected across the inductor 168. The inductor 168 is a primary of a transformer 172. The transformed voltage derived from the secondary winding 174 of the transformer 172 is a standard A.-C. voltage of substantially constant amplitude and pure sine waveform, and is in phase with the input A.-C. supply voltage between the terminals 1 and N.

The standard voltage across the secondary winding 174 is now compared with the output voltage between the output terminals 1' and N. A voltage divider, comprising a resistor 176, a potentiometer 178, and a resistor 180, is connected between the output terminals 1' and N. One end of the secondary winding 174 is connected to the neutral terminal N through a potentiometer 182, and the other end of the secondary winding 174 is connected to the tap $E_1$ on the potentiometer 178. A tap $G_1$ on the potentiometer 182 is connected to the grid of an amplifier tube 184. In this manner, the standard A.-C. voltage across the secondary winding 174 is compared to the output voltage of line $a$ between the output terminals 1' and N, and any error voltage resulting from such comparison is applied as an error signal to the grid of the amplifier tube 184.

The anode of the tube 184 is connected to the D.-C. terminal 110 through a load resistor 186, and the cathode of the tube 184 is connected to the neutral terminal N through a cathode resistor 188. The cathode of the tube 184 is also connected to the positive D.-C. terminal 110 through a resistor 190. The output of the amplifier 184, from the anode thereof, is coupled to the grid of an amplifier tube 192 through a coupling capacitor 194. The anode of the amplifier tube 192 is connected to the positive D.-C. terminal 110 through the primary 196 of an output transformer 198. The cathode of the tube 192 is connected to the negative D.-C. terminal 112 through a resistor 400. A capacitor 402 is connected across the primary winding 196 to suppress spurious oscillation.

The output of the amplifier 192 is coupled to the control grids of amplifier tubes 404 and 406, connected in circuit as a push-pull amplifier. The secondary winding 408 of the output transformer 198 is connected between the control grids of tubes 404 and 406. The anodes of the amplifiers 404 and 406 are connected to each other through the center tapped primary winding 410 of the output transformer 108. The center tap of the primary winding 410 is connected to the positive D.-C. terminal 110. The center tap of the primary winding 410 is also connected to the screen grids of the amplifier tubes 404 and 406 through suitable dropping resistors 411, 413 and 415. The cathodes of the amplifier tubes 404 and 406 are connected to each other and to the negative D.-C. terminal 112 through a common resistor 412. The resistor 412 is bypassed by a capacitor 414. The secondary winding 408 of the transformer 198 is shunted by a center tapped resistor, the center tap of which is connected to the negative D.-C. terminal 112.

The operation of the voltage and waveform regulator of the present invention as a single phase regulator will now be described. Let it be assumed that the input voltage of line $a$ only, between the input terminals 1 and N, is to be regulated so as to produce a pure sine wave of constant amplitude between the output terminals 1' and N. The stepped up voltage across the capacitor 132 is retarded in phase a predetermined number of degrees, for example, −60° by the phase shifting network 133. This relatively high voltage is limited to a square wave by the diodes 140 and 142 of a peak-to-peak voltage that is the difference in voltage between the voltages across the V. R. tubes 156 and 160. This limited square wave is advanced in phase, by the phase shifting network 143 so that it is now in phase with the input voltage between the input terminals 1 and N. The limited square wave is converted to a substantially pure sine wave by the filter network 161 comprising 60 cycle band-pass filters. These latter filters comprise the primary 168 of the transformer 172. The resulting voltage across the secondary winding 174 is now a standard A.-C. voltage, locked in phase with line $a$, and is compared with a portion of the voltage between the output terminals 1' and N. Any error signal is picked up by the tap $G_1$ of the potentiometer 182, is amplified by the two stage amplifier comprising the tubes 184 and 192, is further amplified by the push-pull amplifier comprising the tubes 404 and 406, and is applied as a compensating output voltage across the secondary winding 106 of the transformer 108 in a polarity tending to reduce the error signal. It will be noted that if the error signal at $G_1$ is zero, the voltage across the secondary 106 of the output transformer 108 will be zero, and all of the load current between the input terminals 1 and N and the output terminals 1' and N will be from the input terminal 1 to the intermediate terminal 100 on the autotransformer 102, through the upper portion 416 of the autotransformer 102, through the resistor 104, through output terminal 1', through the load (not shown), and back to the neutral terminal N.

To regulate the voltage and waveform of lines $b$ and $c$, that is, the polyphase voltages between the input terminals 2 and N, and the input terminals 3 and N; similar circuits to those described for the regulation of line $a$ are employed. For example, to regulate line $b$, the voltage across the capacitor 132, already retarded in phase by 60° is retarded in phase an additional 60° by a phase shifting network 418. The −60° phase shifting network 418 comprises an inductor 420 connected to a variable resistor 422, and a resistor 424 connected across the serially connected inductor 420 and variable resistor 422. The junction between the capacitors 132 and 134 is connected to the junction between the resistor 424 and the inductor 420 through a blocking capacitor 426. The junction between the variable resistor 422 and the resistor 424 is connected to the common junction of serially connected diode limiters 240 and 242. The diode limiters 240 and 242 are connected in circuit in the same manner as the diode limiters 140 and 142 and function in a similar manner.

The output of the diode limiters 240 and 242, a limited square wave, is fed to a 60 cycle band-pass filter 261 comprising a capacitor 262, an inductor 264, an inductor 268, and a capacitor 270. The components of the 60 cycle band-pass filter 261 are connected similarly to the components of the band-pass filter 161, previously described. The inductor 268 may be considered the primary of a transformer 272, and the voltage across the secondary winding 274 of the transformer 272 is a standard voltage to be compared with a portion of the output voltage of line $b$. This standard voltage, across the secondary winding 274, is also shifted −120° with respect to the phase of line $a$. A voltage divider, comprising serially connected resistors 276, 278, and 280, is connected between the output terminals 2' and N. The resistor 278 may be a potentiometer whose movable tap $E_2$ is connected to one end of the secondary winding 274. The other end of the secondary winding 274 is connected to the neutral terminal N through a potentiometer 282. The movable tap $G_2$ of the potentiometer 282 is connected to the grid of an amplifier tube 284. The amplifier tube 284 is connected in a substantially similar circuit to that described for the tube 184. The output of the tube 284 is applied to the grid of an amplifier tube 292, connected in circuit substantially the same as described for the tube 292. The output of the amplifier 292 is applied to the control grids of tubes 504 and 506 connected as a push-pull amplifier, in the manner described for the tubes 404 and 406. The output of the tubes 504 and 506 is applied across a secondary winding 206 of the output transformer 208, in the manner described for the output across the secondary winding 106 of the output transformer 108.

Line $c$, that is, the polyphase voltage between the input terminals 3 and N, is regulated in magnitude waveform and phase in the following manner. One side of the capacitor 132 is connected to the common junction of serially connected diode limiters 340 and 342 through a blocking capacitor 508 and a resistor 510. Substantially no phase shift takes place in the circuit comprising the capacitor 508 and the resistor 510. The diode limiters 340 and 342 are connected in circuit in a manner similar to the diodes 140 and 142. The limited square wave output of the diode limiters 340 and 342 is filtered by a 60 cycle band-pass filter 361. The components of the band-pass filter 361 are similar to those of the band-pass filter 161 and comprise an inductor 368, that is, the primary of a transformer 372. The secondary winding 374 of the transformer 372 is wound 180° out of phase with the primary winding 368. Hence, it will be understood that the voltage across the secondary winding 374 is shifted +120° from the voltage applied to the line $a$, between the input terminals 1 and N. This follows from the fact that the voltage across the capacitor 132 is retarded 60°, and the fact that the secondary winding 374 of the transformer 372 is advanced 180° out of phase with the primary winding 368.

The standard A.-C. voltage across the secondary winding 374 is compared with a portion of the voltage on a voltage divider connected between the output terminals 3' and N. This voltage divider comprises a resistor 376, a potentiometer 378, and a resistor 380. One end of the secondary winding 374 is connected to the tap $E_3$ on the potentiometer 378, and the other end of the secondary winding 374 is connected to the neutral terminal N through a potentiometer 382.

The tap $G_3$ on the potentiometer 382 is connected to the grid of an amplifier tube 384. The amplifier 384 is connected in circuit in a manner similar to that described for the amplifier 184. The output of the amplifier 384 is applied to an amplifier 392 in a manner similar to that described for the amplifiers 184 and 192. The output of the amplifier 392 is applied to push-pull amplifiers 604 and 606 in a manner similar to that described for the amplifiers 404 and 406. The output of the amplifiers 604 and 606 is applied across the secondary winding 306 of the output transformer 308 in a manner similar to that described for the output of the amplifiers 404 and 406.

Six controls are provided on this regulator, three gain controls $G_1$, $G_2$, $G_3$, three output voltage controls $E_1$, $E_2$, $E_3$, and three phase control variable resistors 148, 422, and 138, also referred to as $\Delta\phi_{13}$, $\Delta\phi_{23}$, and $\epsilon\phi$, respectively. These controls are used as follows:

Set $G_1$, $G_2$, and $G_3$, at minimum, and all others at mid-range. The unit will not regulate with gain controls off. Connect on the load and apply the supply voltage. Connect a 150 volt A.-C. voltmeter between regulated line $c$ output and neutral, and a 15 volt A.-C. voltmeter between line $c$ input and line $c$ output. Now turn up gain $G_3$ to ½ or ⅔ full value. Line $c$ should be regulated now, and its value may be set to 120 volts by $E_3$.

With line $c$ regulating, adjust $\epsilon\phi$ until the voltage on the 15 voltmeter is a minimum, showing that the output is in phase with the input. Readjust line $c$ to 120 volts if necessary. Then move the 150 voltmeter between the output of the line $b$ and neutral, turn up $G_2$ to same position as $G_3$ and adjust line $b$, by $E_2$, to 120 volts. Follow same procedure with output using $G_1$ and $E_1$. All three lines to neutral voltages are now 120 volts and the voltage at $E_3$ is in phase with the line $c$ input.

The phase adjustments $\Delta\phi_{13}$ and $\Delta\phi_{23}$ may now be set. Connect a 300 volt A.-C. meter between lines $a$ and $c$ output, and adjust $\Delta\phi_{13}$ until this reads 208 volts. With the same meter connected between output lines $b$ and $c$, adjust $\Delta\phi_{23}$ until the reading is 208 volts also. Now if the meter is connected to lines $a$ and $b$, it should read 208 volts, showing all line to line voltages equal. If this is not so, retrim the two phase angle verniers until these three voltages are equal.

With 120 volts per phase input and 1 ampere per phase load, the output voltage may be set to regulate for any voltage between the limits of 110 to 130 volts. This may be interpreted in reverse, that 120 volts output at 1 ampere will be maintained over input limits of 110 to 130 volts per phase. At 0.5 ampere load per phase, the regulating range is from 105 to 135 volts and at no load the range is 100 to 138 volts. The no load to full load transient is barely perceptible on an oscilloscope, and causes a momentary change in output of less than ¼ volt with a recovery time of about ½ cycle. The total harmonic content of any one phase is less than 0.5%, and does not change over the entire no load to full load range. This is the harmonic content of the standard voltages, and better filtering could be used if this small percentage were too high.

Thus, there has been shown and described herein, in accordance with the objects of the present invention, an A.-C. voltage, waveform, and phase regulator for either a single phase supply voltage or a polyphase supply voltage. In either case, a standard voltage is generated for each voltage and phase and compared with the output voltage to obtain an error signal. The amplified error signal is applied to a secondary winding connected in a bridge circuit in a manner whereby no load current flows through the secondary winding in the absence of an error signal. When a single phase supply voltage is regulated, the standard voltage is locked into phase with the supply voltage. When a polyphase voltage is regulated, the phase of only one standard voltage is locked in phase with one of the input lines, and the phase angles between the remaining polyphase standard voltages are measured from the phase of the first standard voltage.

What is claimed is:

1. A regulator circuit for regulating a source of A.-C. supply voltage comprising means to step-up said supply voltage, a pair of output terminals, an impedance, circuit means to apply said stepped-up voltage between said output terminals through said impedance, a source of standard A.-C. voltage, means to compare said standard A.-C. voltage with the voltage between said output terminals whereby to obtain an error signal, means to amplify said error signal, and means connected in shunt with said circuit means and said impedance to apply said amplified error signal from said source of A.-C. supply voltage to one of said output terminals.

2. A regulator circuit for regulating a source of A.-C. supply voltage comprising means to step-up said supply voltage, a pair of output terminals for applying a load therebetween, an impedance, circuit means to apply said stepped-up voltage between said output terminals through said impedance, a source of standard A.-C. voltage, means to compare said standard A.-C. voltage with the voltage between said output terminals whereby to obtain an error signal, means to amplify said error signal, means connected in shunt with circuit means and said impedance to apply said amplified error signal from said source of A.-C. supply voltage to one of said output terminals, and means to fix the phase of said standard A.-C. voltage with respect to said supply voltage.

3. Apparatus for stabilizing the amplitude and waveform of an A.-C. supply voltage for a load with respect to the corresponding characteristics of a standard A.-C. voltage source, said apparatus comprising an amplifier having input means and output means, said output means being connected in series with said supply voltage and said load, an impedance, means to step-up said supply voltage, means connected in shunt with said output means to apply said stepped-up voltage to said load through said impedance, means differentially to combine the voltage across said load and said standard voltage to produce an error signal, and means to apply said error signal to said input means of said amplifier.

4. Apparatus for stabilizing the amplitude, waveform, and phase of an A.-C. supply voltage for a load with respect to the corresponding characteristics of a standard A.-C. voltage source, said apparatus comprising an amplifier having input means and output means, said output means being connected in series with said supply voltage and said load, an impedance, means to step-up said supply voltage, means connected in shunt with said output means to apply said stepped-up voltage to said load through said impedance, means differentially to combine the voltage across said load and said standard voltage to produce an error signal, means to apply said error signal to said input means of said amplifier, and means to fix the phase of said standard A.-C. voltage with respect to said supply voltage.

5. An A.-C. voltage regulator comprising a pair of input terminals for applying a source of unregulated A.-C. voltage therebetween, an autotransformer having one end connected to one of said pair of input terminals and a tap intermediate the ends thereof connected to the other of said input terminals, an impedance, a pair of output terminals for connecting a load therebetween, one of said output terminals being connected to said one of said input terminals, the other of said output terminals being connected to the other end of said autotransformer through said impedance, a source of standard A.-C. voltage, means to compare said standard A.-C. voltage with the voltage between said output terminals to obtain an error signal, means to amplify said error signal, and means to apply said amplified error signal between said tap on said autotransformer and the junction between said impedance and said other of said output terminals.

6. An A.-C. voltage regulator comprising a pair of input terminals for applying a source of unregulated A.-C. voltage therebetween, a transformer having primary and secondary windings, means to connect said primary winding between said pair of input terminals, an impedance, a pair of output terminals for connecting a load therebetween, means to connect said secondary winding in series with said impedance and said pair of output terminals, a source of standard A.-C. voltage, means to compare said standard A.-C. voltage with the voltage between said output terminals to obtain an error signal, means to amplify said error signal, and means to apply said amplified error signal between one of said input terminals and the junction between said impedance and one of said output terminals.

7. Apparatus for stabilizing the amplitude and waveform of the voltages of the lines of a polyphase supply system, each line of said system having effectively a pair of conductors, said apparatus comprising separate means to step-up each of said line voltages, respectively, a separate pair of output terminals for each of said lines, respectively, a plurality of impedances equal in number to the number of said plurality of lines, circuit means to apply said stepped-up voltage of each of said lines between each of said pairs of output terminals through a separate one of said impedances, respectively, a plurality of separate sources of standard A.-C. voltage, one of said separate standard sources for each of said lines, respectively, means to compare each of said standard A.-C. voltages with the voltage between each pair of output terminals whereby to obtain an error signal for each line voltage, respectively, means to amplify each of said error signals, and means to apply a corresponding amplified error signal in shunt with said circuit means and between said step-up means and one of said output terminals in each of said lines, respectively.

8. Apparatus for stabilizing the amplitude, waveform, and phase of the voltages of the lines of a polyphase supply system, each line of said system having effectively a pair of conductors, said apparatus comprising separate means to step-up each of said line voltages, respectively, a separate pair of output terminals for each of said lines, respectively, a plurality of impedances equal in number to the number of said plurality of lines, circuit means to apply said stepped-up voltage of each of said lines between each of said pairs of output terminals through a separate one of said impedance, respectively, a plurality of separate sources of standard A.-C. voltage, one of said separate standard sources for each of said lines, respectively, means to compare each of said standard A.-C. voltages with the voltage between each pair of output terminals whereby to obtain an error signal for each line voltage, respectively, means to amplify each of said error signals, means to apply a corresponding amplified error signal in shunt with said circuit means and between said step-up means and one of said output terminals in each of said lines, respectively, means to fix the phase of one of said sources of standard A.-C. voltage with respect to one of said lines, and means to fix the phase of the other of said sources of standard A.-C. voltage with respect to said one of said sources.

9. A voltage and waveform regulator circuit for a three phase A.-C. voltage, said three phase voltage comprising first, second, and third line A.-C. voltages displaced from each other by substantially 120 electrical degrees, a pair of input terminals for each of said line voltages, a pair of output terminals for each of said line voltages, one of each pair of input terminals and one of each pair of output terminals being a common terminal, a separate impedance for each of said line voltages, means to step-up each of said line voltages, circuit means to apply each of said stepped-up voltages between their respective output terminals through a separate one of said impedances, a separate source of standard A.-C. voltage for each of said line voltages, means to compare each of said standard A.-C. voltages with the voltage of each line between each pair of output terminals, respectively, whereby to obtain an error signal for each line, a separate amplifying means for each error signal from each line, and means to apply a separate output of each of said amplifying means in shunt with said circuit means and between one of said input terminals and one of said output terminals of each line, respectively.

10. A voltage and waveform regulator circuit for a three phase A.-C. voltage, said three phase voltage comprising first, second, and third line A.-C. voltages displaced from each other by substantially 120 electrical degrees, a pair of input terminals for each of said line voltages, a pair of output terminals for each of said line voltages, one of each pair of input terminals and one of each pair of output terminals being a common terminal, a separate impedance for each of said line voltages, means to step-up each of said line voltages, circuit means to apply each of said stepped-up voltages between their respective output terminals through a separate one of said impedances, a separate source of standard A.-C. voltage for each of said line voltages, means to compare each of said standard A.-C. voltages with the voltage of each line between each pair of output terminals, respectively, whereby to obtain an error signal for each line, a separate amplifying means for each error signal from each line, means to apply a separate output of each of said amplifying means in shunt with said circuit means and between said step-up means for each line and one of said output terminals, respectively, means to fix the phase of one of said sources of standard A.-C. voltage with respect to one of said lines, and means to fix the phase of the other of said sources of standard A.-C. voltage with respect to said one of said sources.

11. Apparatus for stabilizing the amplitude, waveform, and phase of a polyphase voltage, $n$ being the number of A.-C. voltage lines of said polyphase voltage displaced from each other by a predetermined number of electrical degrees; said apparatus comprising $n+1$ input terminals and $n+1$ output terminals, one of said input terminals being a common input terminal for each of said lines, one of said output terminals being a common output terminal connected to said common input terminal and common to each output voltage of each of said lines, $n$ transformers each having a primary and a secondary, means to connect each line across a separate primary of said transformers, respectively, $n$ impedances, means to connect a separate one of said secondaries in series with a separate one of said impedances and between a separate pair of said output terminals, respectively, $n$ separate amplifying means each having input means and output means, each of said output means being connected between a separate one of said input terminals and a separate one of said output terminals of each line, respectively, $n$ sources of standard A.-C. voltage for each of said lines, means to fix the phase of one of said sources of standard A.-C. voltage with respect to one of said lines, means to fix the phase of each of the other of said sources with respect to said one source of standard A.-C. voltage, means to compare each standard A.-C. voltage with a separate voltage between a separate pair of output terminals of each line whereby to obtain a separate error signal for each of said lines, and means to apply each of said error signals to a separate one of said input means, respectively.

References Cited in the file of this patent

UNITED STATES PATENTS

| | | |
|---|---|---|
| 1,794,948 | Field | Mar. 3, 1931 |
| 2,041,643 | Huet | May 19, 1936 |
| 2,570,015 | Van Loon et al. | Oct. 2, 1951 |
| 2,682,031 | Pocock | June 22, 1954 |
| 2,714,188 | Scherer | July 26, 1955 |